(12) United States Patent
Park et al.

(10) Patent No.: US 11,709,271 B2
(45) Date of Patent: Jul. 25, 2023

(54) TIME OF FLIGHT SENSING SYSTEM AND IMAGE SENSOR USED THEREIN

(71) Applicant: SK hynix Inc., Gyeonggi-do (KR)

(72) Inventors: Yujin Park, Gyeonggi-do (KR); Hansang Kim, Gyeonggi-do (KR); Jeongeun Song, Gyeonggi-do (KR); Minseok Shin, Gyeonggi-do (KR); Ohjun Kwon, Gyeonggi-do (KR); Kangbong Seo, Gyeonggi-do (KR); Sungwook Seo, Gyeonggi-do (KR); Jinuk Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 518 days.

(21) Appl. No.: 16/890,170

(22) Filed: Jun. 2, 2020

(65) Prior Publication Data

US 2021/0173086 A1 Jun. 10, 2021

(30) Foreign Application Priority Data

Dec. 9, 2019 (KR) .......................... 10-2019-0162790

(51) Int. Cl.
*G01S 17/00* (2020.01)
*G01S 17/894* (2020.01)
*G01S 17/10* (2020.01)
*G01S 7/4865* (2020.01)
*G01S 7/481* (2006.01)
*G01S 7/4863* (2020.01)

(52) U.S. Cl.
CPC .......... *G01S 17/894* (2020.01); *G01S 7/4816* (2013.01); *G01S 7/4863* (2013.01); *G01S 7/4865* (2013.01); *G01S 17/10* (2013.01)

(58) Field of Classification Search
USPC ....................................................... 356/5.01
See application file for complete search history.

(56) References Cited

U.S. PATENT DOCUMENTS

| | | | |
|---|---|---|---|
| 7,128,270 B2 * | 10/2006 | Silverbrook | H04N 1/00376 |
| | | | 235/462.46 |
| 7,505,070 B2 | 3/2009 | Kameshima et al. | |
| 7,994,465 B1 | 8/2011 | Bamji et al. | |
| 8,817,150 B2 | 8/2014 | Giffard et al. | |
| 9,083,907 B2 * | 7/2015 | Oh | H04N 5/357 |
| 9,264,639 B2 | 2/2016 | Guidash et al. | |
| 9,310,891 B2 * | 4/2016 | Rafii | G02B 27/017 |
| 9,600,078 B2 * | 3/2017 | Rafii | G06T 15/20 |
| 9,819,930 B2 * | 11/2017 | Sun | H01L 27/14609 |
| 2004/0190092 A1 * | 9/2004 | Silverbrook | H04N 1/00326 |
| | | | 358/539 |
| 2005/0254106 A9 * | 11/2005 | Silverbrook | H04N 1/00326 |
| | | | 358/539 |
| 2005/0259168 A1 * | 11/2005 | Kameshima | H04N 3/1512 |
| | | | 348/E3.029 |

(Continued)

*Primary Examiner* — James R Hulka
(74) *Attorney, Agent, or Firm* — IP & T Group LLP

(57) ABSTRACT

An image sensor, employed in a time-of-flight (TOF) sensing system, includes a pixel array including a plurality of pixels arranged in plural rows and plural columns, each pixel generating an amount of charge in response to an incident light, and first driving circuitry configured to supply a driving control signal to each pixel via the plural columns. The first driving circuitry is configured to supply the driving control signal via one of odd and even columns.

20 Claims, 11 Drawing Sheets

(56) References Cited

U.S. PATENT DOCUMENTS

| | | | |
|---|---|---|---|
| 2011/0298956 A1* | 12/2011 | Giffard | H04N 5/37206 348/308 |
| 2014/0252203 A1* | 9/2014 | Oh | H04N 5/357 250/208.1 |
| 2015/0062003 A1* | 3/2015 | Rafii | G02B 27/017 345/156 |
| 2015/0229859 A1* | 8/2015 | Guidash | H04N 5/378 348/308 |
| 2016/0353084 A1* | 12/2016 | Sun | H04N 13/254 |
| 2018/0176498 A1* | 6/2018 | Elkhatib | H04N 5/37457 |

* cited by examiner

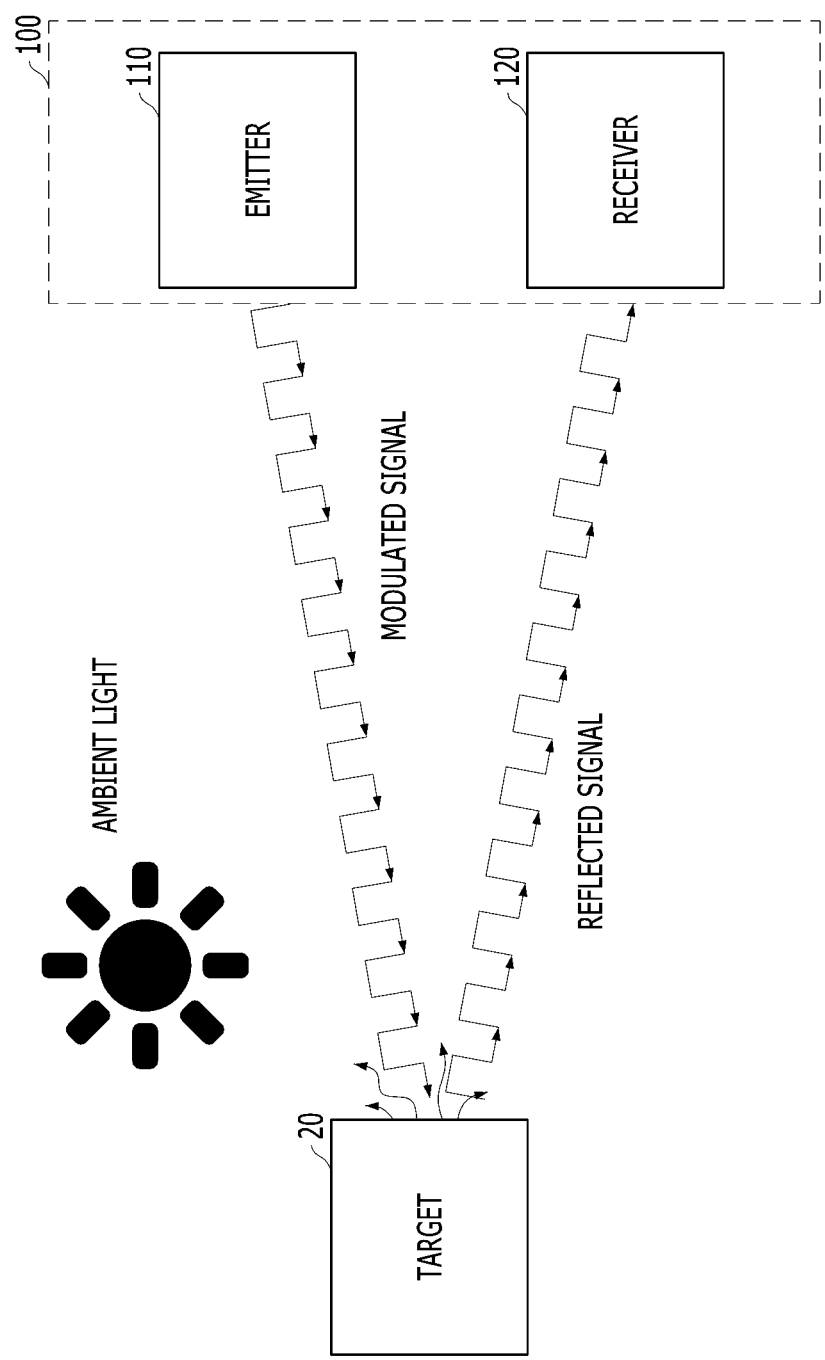

TIME OF FLIGHT SENSING SYSTEM AND IMAGE SENSOR USED THEREIN

CROSS-REFERENCE TO RELATED APPLICATION

This patent application claims the benefit of Korean Patent Application No. 10-2019-0162790, filed on Dec. 9, 2019, the entire disclosure of which is incorporated herein by reference.

TECHNICAL FIELD

This disclosure relates to a sensing device using a time-of-flight (TOF) system, and more particularly, to an apparatus for improving resolution or precision of the sensing device.

BACKGROUND

A time-of-flight (TOF) system measures, to calculate distance to an object, a time that a light or signal takes to travel from an origin to an object and be reflected back from the object to the source, where the total round trip time represents a flight time. The origin may be a source of the light or signal, such as a TOF camera of the TOF system. A TOF camera outputs an image including depth information of the object based on the distance between the object and the TOF camera. A conventional camera is capable of outputting a two-dimensional (2D) image representing a color and a shape of the object, but the TOF camera may output a three-dimensional (3D) image representing not only the 2D image of the object but also a depth of the object.

BRIEF DESCRIPTION OF THE DRAWINGS

The description herein makes reference to the accompanying drawings wherein like reference numerals refer to like parts throughout the figures.

FIG. 1 illustrates an operation of a time-of-flight (TOF) sensing system according to an embodiment of the disclosure.

Figure 2A:
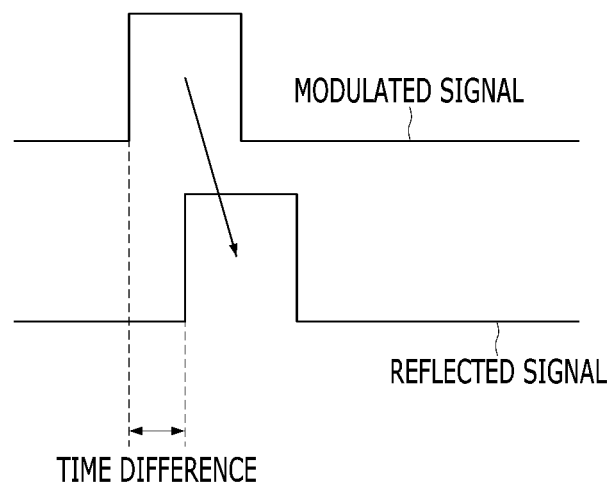
FIGS. 2A and 2B show examples of a measured value in a TOF sensing system according to an embodiment of the disclosure.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

In this disclosure, the terms "comprise," "comprising," "include" and "including" are open-ended. As used in the appended claims, these terms specify the presence of the stated elements and do not preclude the presence or addition of one or more other elements. Any such term used in a claim does not foreclose a device, an apparatus, a sensor or a system from including additional components (e.g., an interface, circuitry, etc.).

In this disclosure, various units, circuits, or other components may be described or claimed as "configured to" perform a task or tasks. In such context, "configured to" is used to connote structure by indicating that the unit/circuit/component includes structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language may include hardware, for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used herein, these terms "first", "second", "third", and so on are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Further, this term "based on" is used to describe one or more factors that affect a determination. This term does not foreclose that additional factors may affect a determination. That is, a determination may be solely based on the stated factors or based, at least in part, on those factors. Consider the phrase "determine A based on B." While in this case, B is a factor that affects the determination of A, such a phrase does not foreclose the determination of A also being based on C. In other instances, A may be determined based solely on B.

As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

An embodiment of this disclosure can provide an apparatus configured to avoid distortion of information obtained from each pixel. The distortion may occur because of a distance difference between pixels, included in a pixel array of the image sensor employed in a time-of-flight (TOF) sensing system, and driving circuitry configured to drive the pixel array.

Further, an embodiment of this disclosure can provide an apparatus configured to provide a driving voltage to a pixel array including a plurality of pixels arranged in plural rows and plural columns in a time-of-flight (TOF) sensing system, in an order that can compensate for a distance difference between driving circuitry and each pixel.

In addition, an embodiment of this disclosure can provide an apparatus configured to supply a driving voltage to plural pixels arranged in every two column of pixel array in order to compensate for a difference in operation between pixels due to a delay, a resistance or etc. existing in a process of transferring the driving voltage outputted from driving circuitry. The delay, the resistance or etc. may be increased, as a size of the image sensor included in the TOF sensing system increases. The driving voltage may power each pixel. The driving circuitry may generate and supply the driving voltage every two columns of the pixel array. For example, the driving circuitry supplying the driving voltage to each pixel may be coupled to every two columns of the pixel array.

In an embodiment, an image sensor employed in a time-of-flight (TOF) sensing system can include a pixel array including a plurality of pixels arranged in plural rows and plural columns, each pixel generating an amount of charge in response to an incident light; and first driving circuitry configured to supply a driving control signal to each pixel via the plural columns. The first driving circuitry can be configured to supply the driving control signal via one of odd and even columns.

By the way of example but not limitation, the image sensor can have a first structure in which the first driving circuitry supplies the driving control signal to a terminal of the odd column or a second structure in which the first driving circuitry supplies the driving control signal to a terminal of the even column. The other terminal of the odd column can be coupled to the other terminal of the even column.

The image sensor can further include second driving circuitry configured to supply the driving control signal via the other of the odd and even columns.

The first driving circuitry and the second driving circuitry can be located at opposite sides of the pixel array.

Distances between the pixel array and each of the first driving circuitry and the second driving circuitry can be identical.

Each pixel can include at least one photo diode and at least one transfer gate. Each pixel can include the same number of photo diodes and the same number of transfer gates. The driving control signal can be inputted at the at least one transfer gate.

The pixel can include first receiving circuitry configured to receive the incident light in a first phase section; and second receiving circuitry configured to receive the incident light in a second phase section which is opposite to the first phase section.

In another embodiment, an image sensor included in a time-of-flight (TOF) sensing system can include a pixel array including a plurality of pixels arranged in plural rows and plural columns, each pixel generating an amount of charge in response to an incident light; first driving circuitry configured to supply a first driving control signal to some pixels via some of the plural columns; and second driving circuitry configured to supply a second driving control signal to remaining pixels via remaining columns.

For example, the second driving control signal can be transferred via an even column of the plural columns when the first driving control signal is transferred via an odd column of the plural columns. In another example, the second driving control signal is transferred via the odd column of the plural columns when the first driving control signal is transferred via the even column of the plural columns.

The first and second driving control signals can be individually supplied via an alternate one of the plural columns.

The first and second driving circuitry can be arranged on the opposite sides of the pixel array.

Each pixel can include at least one photo diode and at least one transfer gate. Each pixel can include the same number of photo diodes and the same number of transfer gates. The driving control signal can be inputted to the at least one transfer gate of each pixel.

The image sensor can further include a signal converter configured to convert pixel information outputted from the pixel array into a digital signal.

In another embodiment, a time-of-flight (TOF) sensing system can include an emitter configured to output a modulated signal having a preset phase; an image sensor configured to receive a reflected signal which is inputted in response to the modulated signal reflected from an object; and a signal processor configured to determine a distance from the object based on a phase relationship between the modulated signal and the reflected signal. The image sensor can include a pixel array including a plurality of pixels arranged in plural rows and plural columns, each pixel generating an amount of charge in response to the reflected signal; and first driving circuitry configured to supply a driving control signal to each pixel via the plural columns. The first driving circuitry can be configured to supply the driving control signal via one of odd and even columns.

The image sensor can have a first structure in which the first driving circuitry supplies the driving control signal to a terminal of the odd column or a second structure in which the first driving circuitry supplies the driving control signal to a terminal of the even column. The other terminal of the odd column can be coupled to the other terminal of the even column.

The image sensor can further include second driving circuitry configured to supply the driving control signal via the other of the odd and even columns.

The first driving circuitry and the second driving circuitry can be located in opposite sides of the pixel array.

Distances between the pixel array and each of the first driving circuitry and the second driving circuitry can be identical.

Each pixel can include at least one photo diode and at least one transfer gate. Each pixel can include the same number of photo diodes and the same number of transfer gates. The driving control signal can be inputted to the at least one transfer gate of each pixel.

The pixel can include first receiving circuitry configured to receive the incident light in a first phase section; and second receiving circuitry configured to receive the incident light in a second phase section which is opposite to the first phase section.

In another embodiment, an image sensor can include a pixel array including pixels arranged in row and column lines, each pixel configured to generate charge, an amount of which corresponds to an amount of incident light sensed by the corresponding pixel; and driving circuitry coupled to the column lines at a periphery of the pixel array and configured to supply a driving control signal, which has substantially the same period as the incident light, to the pixels through each pair of odd and even column lines such that sums of amounts sensed by two pixels arranged on pairs of row lines are substantially the same. The pixel array can be configured to generate a sum of the charges generated by each pair of two pixels arranged on pairs of row lines.

Embodiments of the disclosure are described below with reference to the accompanying drawings, wherein like numbers reference like elements.

FIG. 1 illustrates an operation of a time-of-flight (TOF) sensing system according to an embodiment of the disclosure.

Referring to FIG. 1, a TOF sensing system 100 can measure a distance from a target 20. The TOF sensing system 100 can include an emitter 110 configured to output a modulated signal used for measuring a distance from the target 20 and a receiver 120 configured to receive a reflected signal reflected from the target 20.

The modulated signal may transmitted to the target 20 and then reflected back to the target 20. The modulated signal and the reflected signal may have the same characteristics such as a wavelength.

The TOF sensing system 100 may be considered an important device for automation development in various industrial fields and consumer markets. An end-user device such as a mobile phone, a tablet, a vehicle and the like may include the TOF sensing system 100. The TOF sensing system 100 can be used to recognize objects in a surrounding environment or a position of the device relative to one or more objects in the surrounding environment. For example, a camera of the TOF sensing system 100 may determine a color, a shape, and a depth (distance) of the target 20 in a three-dimensional (3D) environment (e.g., scene or image frame) to provide 3D vision technology for the consumer using the device.

The modulated signal outputted from the emitter 110 in the TOF sensing system 100 may have a set pattern. The emitter 110 can transmit a modulated signal that can be reflected from various objects in the surrounding environment. When the reflected signal is received by the receiver 120, the TOF sensing system 100 may determine a distance based on a correlation relationship between the modulated signal, which is outputted from the emitter 110, and the reflected signal which is received by the receiver 120.

In a procedure of recognizing the correlation relationship between the modulated signal and the reflected signal and determining the distance based on the correlation relationship, ambient light may disturb the TOF sensing system 100. Specifically, in order to obtain a distance (e.g., depth information) in bright sunlight or to obtain a high resolution image, an additional process may be performed to remove disturbance (e.g., noise) caused by the ambient light.

Figure 2B:
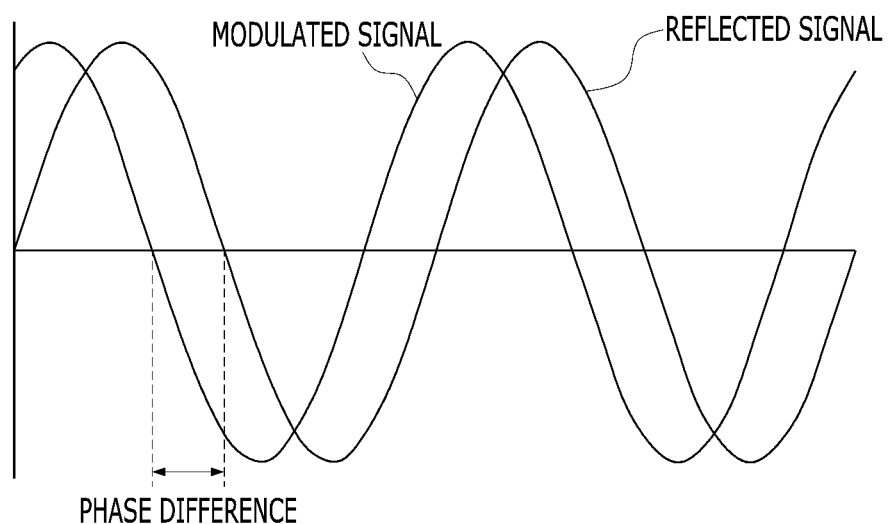

FIGS. 2A and 2B show examples of a measured value in a TOF sensing system 100 according to an embodiment of the disclosure. Specifically, FIG. 2A illustrates the TOF sensing system 100 which is capable of measuring a time difference or a time delay between the modulated signal and the reflected signal. FIG. 2B describes the TOF sensing system 100 which is capable of measuring a phase difference or a phase delay between the modulated signal and the reflected signal.

Referring to FIG. 2A, the time difference or time delay between the modulated signal and the reflected signal may be measured. The modulated signal is outputted from the emitter 110 and reflected on the target 20. The receiver 120 may directly measure a round trip time when the reflected signal is received after the modulated signal is emitted. Here, the modulated signal may have a set pulse. The illuminance intensity of the modulated signal can be much greater than that of other light in a background such as the ambient light. A method for measuring the time difference or time delay may be easily applicable to a Light Detection and Ranging (LiDAR) apparatus equipped with an autonomous vehicle, because the method can be used outdoors and easy to measure a long distance from a target or an object. However, because a time-to-digital converter (TDC) is required in the TOF sensing system 100 configured to measure the time difference or time delay, the TOF sensing system 100 can be expensive and the time difference or delay might not be time-measured in many pixels, so that a resolution of image including depth information or distances obtained by the TOF sensing system 100 can be low. The TOF sensing system 100 for measuring the time difference or time delay may have been used in an expensive device used mainly for the specific purpose of a satellite, a space exploration tool, a national defense device, and the like.

Referring to FIG. 2B, the TOF sensing system 100 can measure the phase difference or the phase delay between the modulated signal and the reflected signal. A distance between the TOF sensing system 100 and a target/object can be estimated through a signal processing method for measuring the phase difference or the phase delay. This method is easier than the method shown in FIG. 2A to measure a relatively short distance within several meters, and thus may be mainly used indoors. Because the 3D image can be obtained through a signal processing method inside the image sensor, the TOF sensing system 100 can be minimized. The TOF sensing system 100 may require a small amount of calculation, so that the TOF sensing system 100 has a high frame rate. In addition, the TOF sensing system 100 for measuring the phase difference or the phase delay can be implemented within a small space and with a low cost. However, to measure the phase difference or the phase delay, a measurable distance may be limited. For example, because the phase difference is used to measure a distance, an object more distance than one period may not be measured accurately. When a period corresponds to 10 m and a phase difference is 180° (a half period), the half period may correspond to 5 m or 15 m. Further, when a phase difference is 0°, no phase difference may correspond to 0m, 10 m or 20 m. This may be referred to as an ambiguity problem.

Figure 3:
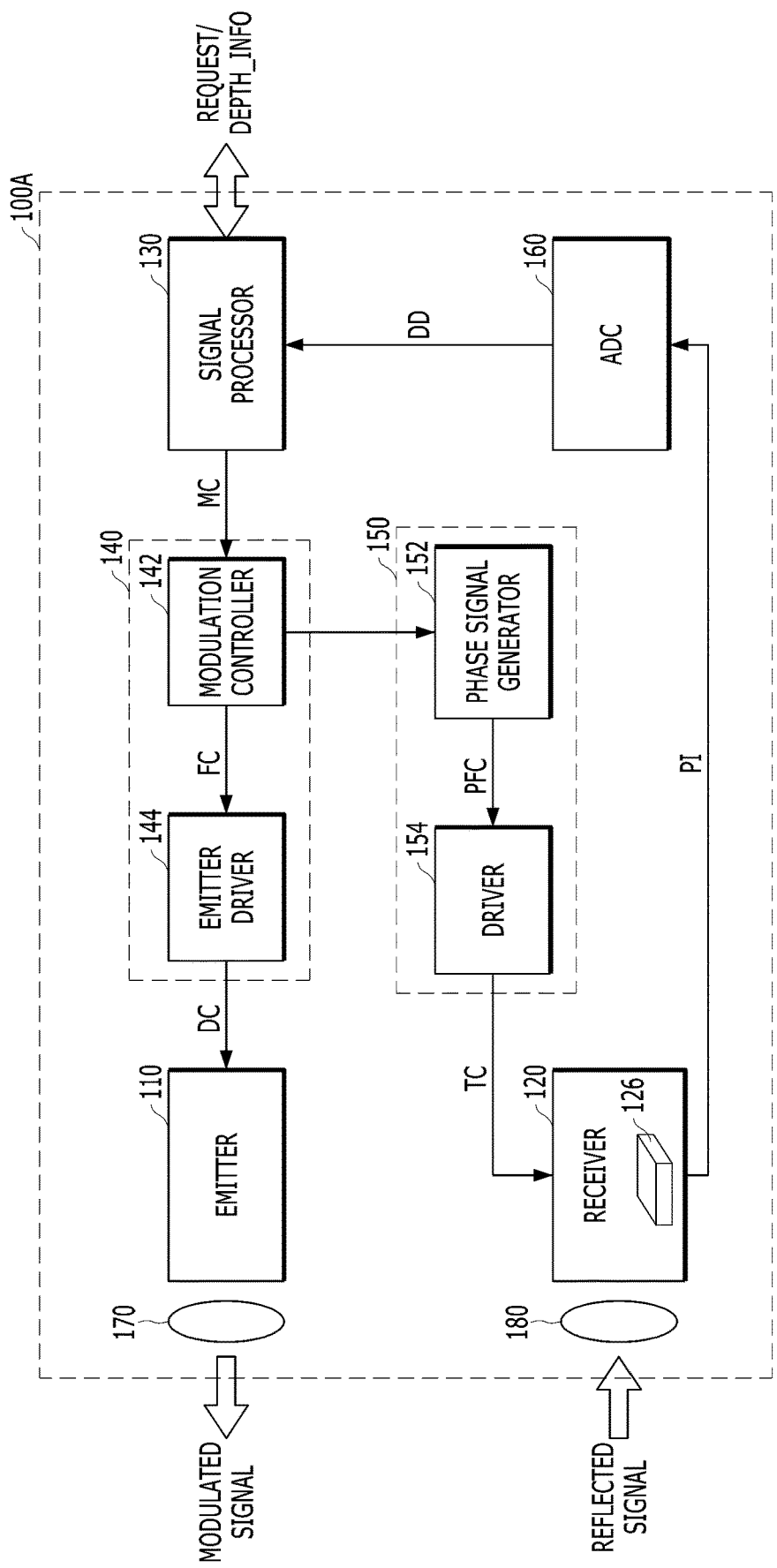
FIG. 3 illustrates a first example of a TOF sensing system according to an embodiment of the disclosure.

FIG. 3 illustrates a first example of a time-of-flight (TOF) sensing system 100 according to an embodiment of the disclosure. Specifically, FIG. 3 shows an example of a TOF sensing system 100A using a continuous wave modulation scheme. When the time of flight can be directly measured through the modulated signal and the reflected signal, a distance between a TOF sensing system and a target can be calculated based on the speed of light (e.g., light constant c). However, it is difficult to directly measure an exact time of flight of the modulated signal, and an error such as a circuit delay can occur in receiving the modulated signal and analyzing the modulated signal. Herein, a TOF sensing system 100A using the continuous wave modulation scheme may measure a phase difference between the modulated signal and the reflected signal. The TOF sensing system 100A can recognize a phase difference, Based on a correlation relationship between the modulated signal and the reflected signal such as the phase difference, the TOF sensing system 100A can calculate a distance when a modulation frequency and the speed of modulated signal are known.

Referring to FIG. 3, the TOF sensing system 100A may include an emitter 110, a receiver 120, a signal processor 130, a modulator 140, a demodulator 150, a signal converter 160, a first lens unit 170, and a second lens unit 180.

The signal processor 130 may receive a request for distance measurement or depth information from another device or a user interface of the TOF sensing system 100A. In response to the request, the signal processor 130 may output data about the estimated distance or the depth information. The signal processor 130 may enable the modulator 140, based on the request. For example, the signal processor 130 may output a modulation control signal MC to the modulator 140 to operate the modulator 140.

In response to an output of the signal processor 130, the modulator 140 may work to generate a modulated signal to be outputted, emitted or radiated through the emitter 110. According to an embodiment, the modulator 140 may include a modulation controller 142 and/or an emitter driver 144. The modulation controller 142 may output a modulation period signal FC such that the emitter 110 outputs the modulated signal that can be distinguished from ambient light. According to an embodiment, the emitter 110 may include a light emitting device (e.g., a light emitting diode), and an emitting control signal DC outputted from the modulator 140 may be used for driving the light emitting device. According to another embodiment, the emitter driver 144 may be included in the emitter 110. The modulator 140 may control the emitter 110 so that the modulated signal generated by the transmitter 110 may have a set frequency or a set amplitude. The modulation controller 142 may output the modulation period signal FC having a specific frequency or a specific phase to the emitter 110.

The modulation controller 142 included in the modulator 140 may generate the modulation period signal FC for generating a modulation signal after receiving the modulation control signal MC. The modulation signal may be one of various types of signals. For example, the emitter driver 144 may use a modulation period signal FC to control a pulse outputted from a light source or a light modulation element included in the emitter 110. According to an embodiment, the modulation controller 142 may output a modulated signal such as a triangular wave (e.g., ramp waveform), a sine wave, a sine wave, a square wave, or the like through a light source or a light modulation element included in the transmitter 110.

On the other hand, due to a driving error and a nonlinearity of a light emitting diode (LED) or a laser diode (LD) included in the emitter 110, the emitter 110 might not output the modulated signal as an ideal waveform such as a pulse, a triangle wave, a sine wave or the like. For example, the light emitting diode (LED) may operate above a threshold current. Nonlinearity and saturation of an output optical power with respect to the input current may occur even in a driving period where a current is supplied to the light emitting diode (LED). In addition, the light emitting diode (LED) may not have a linear gain of light modulation in the driving period. Specifically, in a case of supplying a high voltage or a high current to the emitter 110, the nonlinearity or a driving error of the light emitting diode (LED) may grow worse based on a configuration or a design of driving circuit such as the emitter driver 144. This driving error may directly affect a result of distance/depth information extraction, so that the distance calculated by the TOF sensing system 100A might be not accurate. Accordingly, in an embodiment, the modulation controller 142 in the modulator 140 may include a complex additional algorithm and/or a driving circuit to compensate for the driving error.

The emitter driver 144 may output the emitting control signal DC used for driving a light source or an optical modulator included in the emitter 110. In response to the emitting control signal DC, the emitter 110 may output the modulated signal. In an embodiment, the emitter 110 may include a laser diode or the like which is capable of outputting a signal or light having a set wavelength in response to the emitting control signal DC outputted from the modulator 140. For example, the modulated signal outputted from the emitter 110 may have a frequency in an infrared or ultraviolet region, not in a region of visible light used to determine the color, shape or etc. of objects in a three-dimensional environment. The emitter 110 may include a light emitting diode (LED) or a laser diode (LD) for generating light of a specific wavelength (e.g., near infrared of 850 nm). In FIG. 3, the emitter driver 144 is disposed the modulator 140. But, according to another embodiment, the emitter driver 144 is disposed in the transmitter 110 which includes the light emitting diode (LED) or the laser diode (LD). According to another embodiment, the light emitting diode (LED) or the laser diode (LD) in the emitter 110 is directly driven and controlled by the modulation controller 142 without the emitter driver 144.

The modulated signal outputted from the emitter 110 may be emitted from the TOF sensing system 100A through the first lens unit 170. The first lens unit 170 may be implemented in various ways depending on a purpose of use, an operating environment or the like of the TOF sensing system 100A. For example, the first lens unit 170 may emit the modulated signal at a specific position or area. Or, the first lens unit 170 may evenly distribute the modulated signal to a set area within an image frame or a scene. The first lens unit 170 may include one or more lens controlled to widen or narrow an emission range of modulated signal.

The reflected signal included in incident light may be inputted to the receiver 120 through the second lens unit 180. According to an embodiment, the second lens unit 180 may integrate the reflected signal and transfer the reflected signal to the receiver 120. Like the first lens unit 170, the second lens unit 180 may include one or more lens. Although not shown in FIG. 3, the TOF sensing system 100A may include a lens controller configured to control motorized photographic lens functions such as zoom, focus, and iris opening (aperture). The lens controller may control the second lens unit 180, including any additional lens thereof. In addition, the second lens unit 180 may include at least one filter, which may be disposed between adjacent lens of the second lens 180 for removing signals or lights not relevant to the reflected signal from the incident light. For example, though the incident light may have various wavelengths, in which case the filter(s) may pass the reflected signal of a specific wavelength corresponding to the modulated signal.

The receiver 120 may include a pixel array 126. The pixel array 126 may include a plurality of pixels, each capable of receiving the reflected signal and generating pixel information PI (e.g., an amount of charge) or a signal corresponding to the reflected signal. The plurality of pixels may be arranged in a form of array. The pixel array 126 disposed in the receiver 120 may be controlled by the demodulator 150 to output a plurality of pixel information PI (e.g., an amount of charge) or a plurality of signals to the signal converter 160.

The modulation period signal FC outputted from the modulation controller 142 in the modulation unit 140 may include information regarding the modulation signal outputted through the first lens unit 170. The modulation period signal FC may be inputted to the demodulator 150. The demodulator 150 may output a driving control signal TC for controlling the receiver 120 based on the modulation period signal FC. The demodulator 150 may determine different phases of the driving control signal TC, which correspond to a phase of the modulation period signal FC. According to an embodiment, the demodulator 150 may include a phase signal generator 152 and a driver 154. The phase signal generator 152 may output phase information signals PFC such as 0 degrees and/or 180 degrees. In another embodiment, the phase signal generator 152 in the demodulator 150 may output phase information signals PFC such as 90 degrees, 180 degrees, 270 degrees and/or 360 degrees to the driver 154. In response to the phase information signals PFC determined by the phase signal generator 152, the driver 154 may output the driving control signal TC to the receiver 120. Here, the receiver 120 may include the pixel array 126. The reflected signals collected by the receiver 120 may be determined by the phase converter 152 and the driver 154 in the demodulator 150, which is described in detail below with reference to FIGS. 6 and 7. Because the demodulator 150 recognizes characteristics of the modulated signal through the modulation period signal FC, the demodulator 150 can control or drive the receiver 120 through a phase shift to measure or collect the reflected signals.

The receiver 120 may be controlled based on the drive control signal TC outputted from the demodulator 150. The demodulator 150 may generate the drive control signal TC, in response to the modulation period signal FC used for controlling the emitter 110. The phase signal generator 152 in the demodulator 150 may output the phase information signals PFC which are corresponding to the modulation period signal FC, and the driver 154 may drive the receiver 120 based on the modulation phase signals PFC. The driver 154 may generate the driving control signal TC. Here, the modulation phase signals PFC may include plural signals having a set phase difference such as 180° or 90° from each other. The driver 154 may output the driving control signal TC for driving the plurality of pixels in the pixel array 126 included in the receiver 120, in response to the modulation phase signals PFC.

The plurality of pixel information PI (e.g., an amount of charge) or the plurality of signals outputted from the receiver 120 may be converted into plural pieces of digital data through the signal converter 160. For example, the plurality of pixel information PI (e.g., an amount of charge) or the plurality of signals outputted from the receiver 120 controlled by the demodulator 150 may be analog data, and the signal converter 160 may convert the pixel information PI into the plural pieces of digital data DD. The data DD converted by the signal converter 160 can be transferred to the signal processor 130.

The signal processor 130 may calculate or estimate a distance between the TOF sensing system 100A and the target 20 through a calculation process based on the pieces of data transmitted from the signal converter 160. An operation of the signal processor 130 is described below with reference to FIGS. 6 to 7. In addition, the depth information regarding an object included in a scene or a specific area may be calculated based on the estimated distance calculated by the signal processor 130. For example, it is assumed that a distance between the TOF sensing system 100A and a first position of the target 20 is 3 m, and another distance between the TOF sensing system 100A and a second position of the target 20 is 3.5 m. In this case, the TOF sensing system 100A can recognize that depth information between the first position and the second position is 50 cm. An image generated by a camera including the TOF sensing system 100A can show the target 20 in three dimensions based on the depth information.

Figure 4:
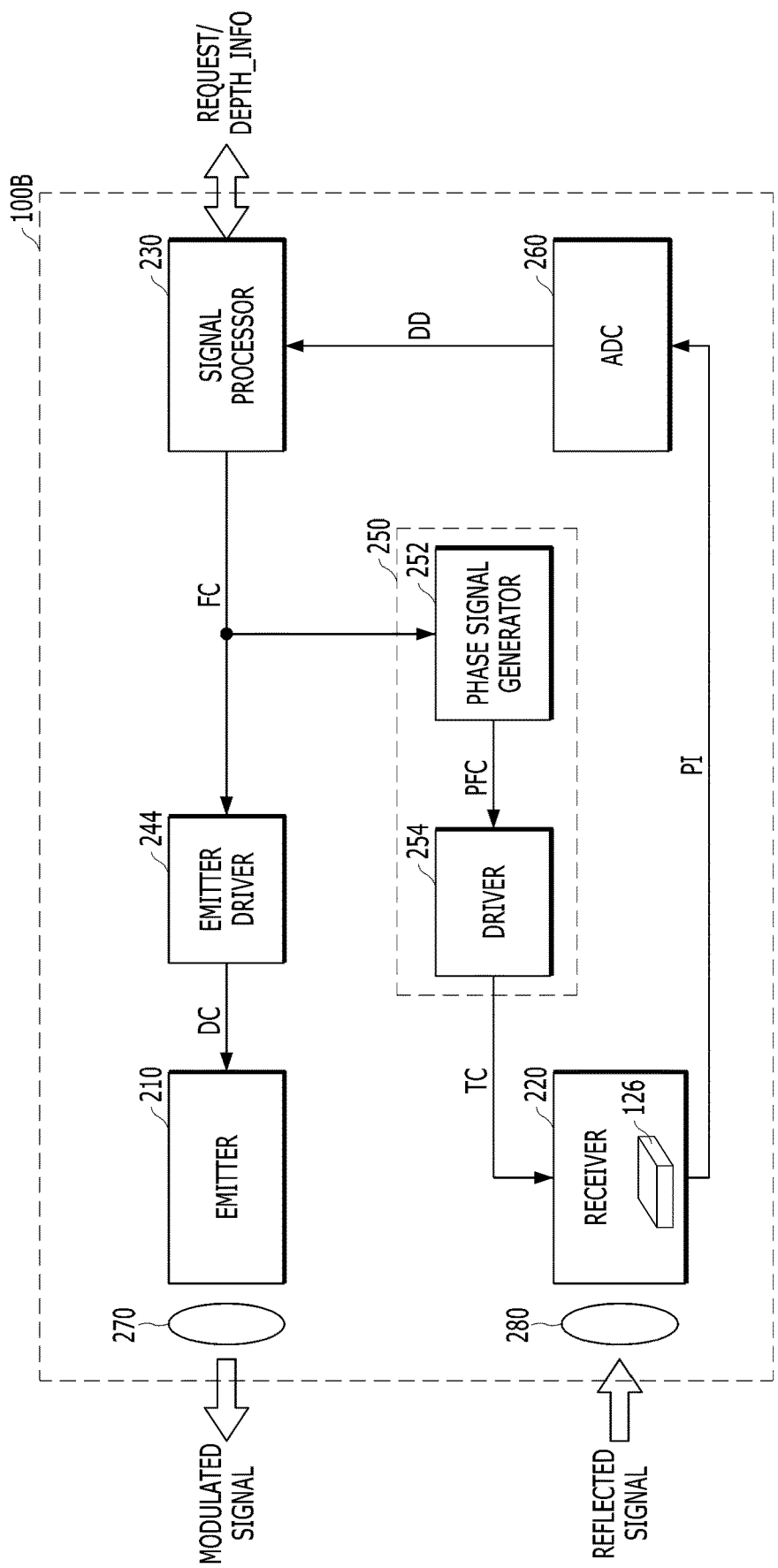
FIG. 4 illustrates a second example of a TOF sensing system according to an embodiment of the disclosure.

FIG. 4 illustrates a second example of a TOF sensing system 100 according to an embodiment of the disclosure. As compared with the first example of the time-of-flight (TOF) sensing system described with reference to FIG. 3, the TOF sensing system 100 shown in FIG. 4 can be simplified structurally for easier application to a small electronics such as a mobile phone, a camera and the like.

Referring to FIG. 4, a TOF sensing system 100B can include an emitter 210, a receiver 220, an emitter driver 244, a demodulator 250, a signal processor 230, a signal converter 260, a first lens unit 270, and a second lens unit 280. According to an embodiment, the demodulator 250 may include a phase shifter 252 and a driver 254. Each of the first and second lens units 270, 280 may include multiple lenses.

A configuration (e.g., components) of the TOF sensing system 100B described with reference to FIG. 4 may be the same or similar to that of the TOF sensing system 100A described with reference to FIG. 3. By the way of example but not limitation, the emitters 210, 110, the receivers 220, 120, the demodulators 150, 250, the first lens units 270, 170 and the second lens units 280, 180 may perform similar functions or play similar roles. Accordingly, the description below focuses on the differences of the structure of FIG. 4 relative to that shown in FIG. 3.

The signal processor 230 may receive a request for obtaining or measuring a distance (depth information) from another device or a user interface which is coupled with the TOF sensing system 100B. In response to the request, the signal processor 230 may output data about the estimated or calculated distance to another device or the user interface. After receiving the request for obtaining the distance or the depth information, the signal processor 230 may output a modulation period signal FC having a set modulation frequency to the emitter driver 244. The emitter driver 244 may output an emitting control signal DC in response to the modulation period signal FC outputted from the signal processor 230.

In addition, the modulation period signal FC having the modulation frequency outputted from the signal processor 230 may be inputted to the demodulator 250. The demodulator 250 may output a driving control signal TC for controlling the receiver 220 in response to the modulation period signal FC. The demodulator 250 may determine different phases corresponding to the modulation period signal FC. For example, the phase signal generator 252 in the demodulator 250 may output phase information PFC such as 90 degrees, 180 degrees, 270 degrees, or 360 degrees to the driver 254. In response to the phase information PFC determined by the phase signal generator 252, the driver 254 may transmit the driving control signal TC to the receiver 220. Here, the receiver 220 may include a pixel array 126. Herein, the driving control signal TC may include plural signals having different phases. The reflected signals collected by the receiver 220 controlled by the phase signal generator 252 and the driver 254 in the demodulator 250 is described with reference to FIGS. 6 and 7.

Because the demodulator 250 recognizes the characteristics of the modulated signal through the modulation period signal FC, the demodulator 250 may drive the receiver 220 through a phase shift to measure or collect the reflected signal. Herein, the phase shift may include a process for receiving incident light via plural paths switched, or selected, by signals, each signal having a different phase.

The receiver 220 may output pixel information PI, after measuring, collecting, or determining the reflected signal in response to the driving control signal TC transmitted from the demodulator 250. The pixel information PI may be inputted to the signal converter 260. The signal converter 260 may output the digital data DD to the signal processor 230. The signal processor 230 may calculate or obtain distance information based on the digital data DD. A detailed operation of the signal processor 230 is described below with reference to FIGS. 6 and 7.

According to an embodiment, the TOF sensing systems 100A, 100B can include any of various suitable circuitry, circuits and algorithms configured to generate the modulated signal outputted from the emitters 110 and 210 as well as the driving control signal TC used for driving the pixel array 126 included in the receivers 120 and 220. The driving control signal TC may be associated with the modulated signal.

The TOF sensing systems 100A, 100B described with reference to FIGS. 3 and 4 may be distinguishable from each other. The modulation controller 142 may be included in the TOF sensing system 100A, but not included in the TOF sensing system 100B. According to an embodiment, the modulation controller 142 may perform an operation for reducing abnormalities of the modulation signal and an error of the modulation signal outputted through the emitter 110. Consistency of the modulation signal is important in obtaining a phase of the reflected signal. In the TOF sensing system 100A, the modulation controller 142 may generate the modulation signal with various characteristics and shapes, so that depth/distance information may be easily performed even in various environments by using the modulation signal. For example, when it is determined that an error is severe in obtaining depth/distance information in a specific environment, the signal processor 130 may generate the modulation control signal MC to the modulation controller 142 so that the modulation controller 142 can output at least one of the modulation period signals FC having a different shape or a different frequency to improve accuracy of depth information in various environments.

Figure 5:
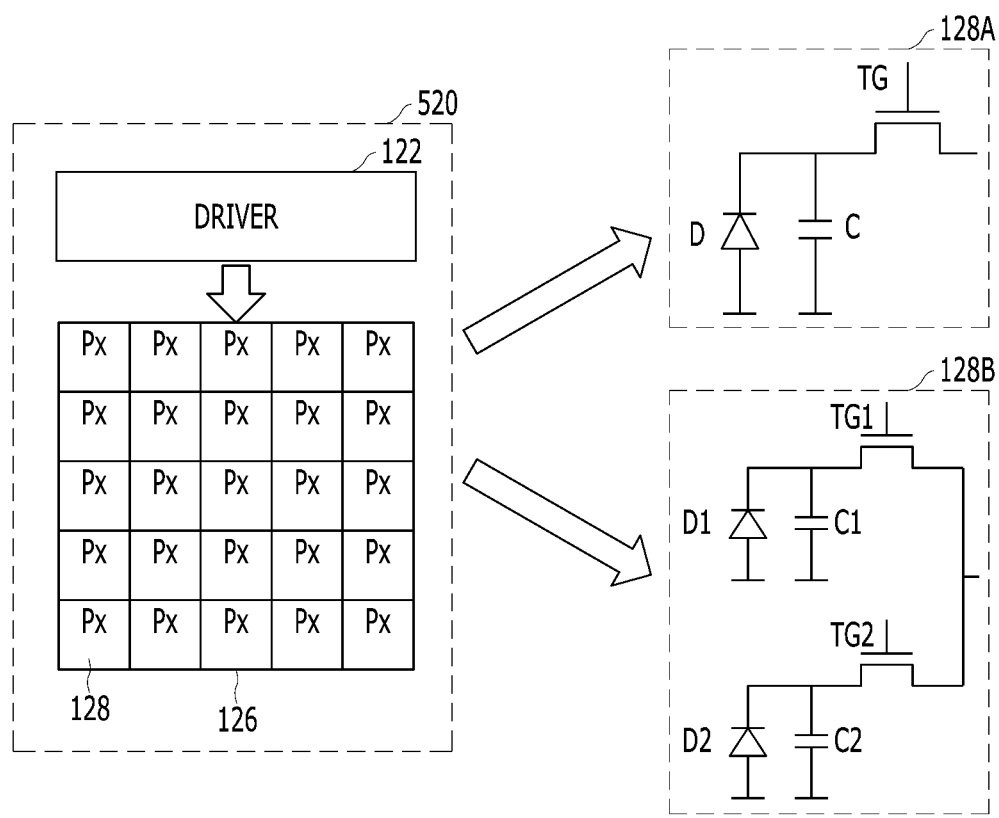
FIG. 5 shows an example of pixels included in an image sensor equipped with a TOF sensing system according to an embodiment of the disclosure.

FIG. 5 shows an example of pixels included in an image sensor equipped with a TOF sensing system according to an embodiment of the disclosure.

Referring to FIG. 5, an image sensor 520 may include a pixel array 126 including a plurality of pixels 128 and a driver 122 for driving the pixel array 126. In the pixel array 126, a plurality of pixels 128 may be arranged according to a plurality of rows and a plurality of columns.

In one embodiment, each pixel 128A may include a single light receiving element such as a photodiode D and a single transfer gate TG. In another embodiment, each pixel 128B may include two light receiving elements such as photodiodes D1, D2 and two transfer gates TG1, TG2.

In the second example, the pixel 128B may include two nodes or two taps. Each of two light receiving elements in each pixel can individually generate an amount of photo-charge in response to an incident light such as the reflected signal shown in FIGS. 1 to 4. But, the two transfer gates TG1, TG2 may be controlled by driving control signals having opposite phases. Because each of two light receiving elements can generate an amount of photo-charge while the reflected signal is received, the amount of photo-charge generated in each pixel might be larger than that generated in each pixel having a single light receiving element if the light receiving elements has a same flat size. However, the two transfer gates TG1, TG2 can alternatively output the amount of photo-charge because the driving control signals have the opposite phases, so that it may appear that each pixel can operate like two pixels working with a time lag. Accordingly, a light reception area of each pixel might not be reduced even though a size of pixel may be decreased. Further, a resolution of the image sensor may be improved.

Figure 6:
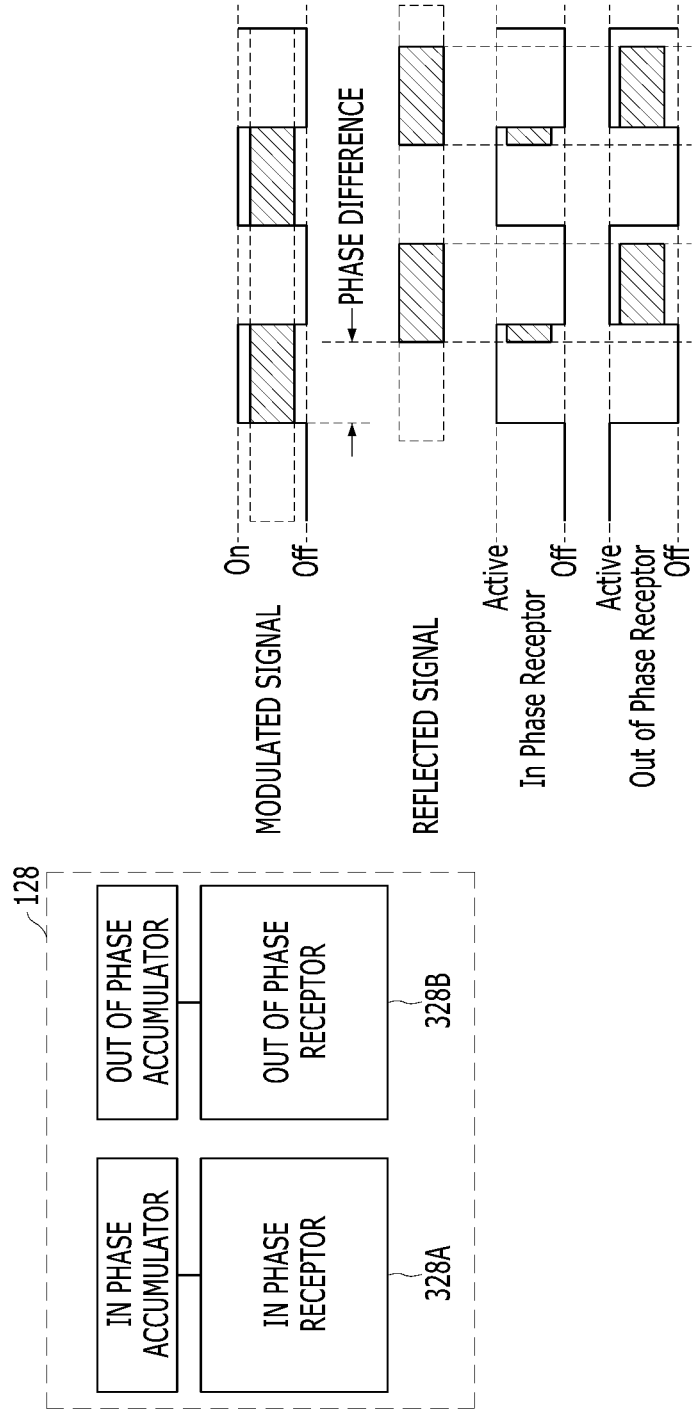
FIG. 6 illustrates an operation of an image sensor included in a TOF sensing system according to an embodiment of the disclosure.

FIG. 6 illustrates an operation of an image sensor included in the TOF sensing system according to an embodiment of the disclosure.

Referring to FIGS. 1, 5 and 6, a plurality of pixels 128 included in the image sensor 520 mounted in the TOF sensing system 100 may include a pair of receivers 328A, 328B. Referring to FIGS. 5 and 6, the pixel 128 may include a pair of receivers 328A, 328B. In another example, two adjacent pixels 128 may work together in a pair.

As shown in FIGS. 1 to 4, the modulated signal outputted from the TOF sensing system 100 may be inputted as the reflected signal after being reflected by the target 20.

A pair of receivers 328A, 328B may include a first phase receiver 328A and a second phase receiver 328B. The first phase receiver 328A and the second phase receiver 328B may alternatively perform conversion of light or photons to electronic charge. The first phase receiver 328A and the second phase receiver 328B may output the pixel information PI corresponding to the reflected signal (e.g., incident light) at different times, i.e., different phases which are opposite to each other. The first phase receiver 328A may be referred as to an in-phase receptor, while the second phase receiver 328B may be referred as to an out-of-phase receptor.

According to an embodiment, the modulated signal may include an active section where the emitters 110, 210 are turned on and an inactive section where the emitters 110, 210 are turned off. The active section may correspond to a half period of the modulated signal and the inactive section may correspond to the other half period of the modulated signal. Herein, the active section and the inactive section may be the same amount of time. The modulated signal may travel to the target 20 and then be reflected from the target 20 as the reflected signal, which is recognized by the receivers 120, 220. Herein, the reflected signal and the modulated signal can have the same characteristics such as a period or a frequency. The reflected signal received by the receivers 120, 220 and the modulated signal may have a phase difference representing a flight time or a flight distance between the TOF sensing system 100 and the target 20.

According to an embodiment, during a half period in which the emitters 110, 210 are turned on for outputting the modulated signal, the first phase receiver 328A is activated and the second phase receiver 328B is inactivated. During the other half period in which the emitters 110, 210 are turned off, the first phase receiver 328A is inactivated and the second phase receiver 328B is activated.

When the reflected signal and the modulated signal have the phase difference as shown in FIG. 6, some of charge generated in response to the reflected signal may be outputted from the first phase receiver 328A, and the remainder of charge may be outputted from the second phase receiver 328B. Comparing the amounts of the charges, which are outputted through the first phase receiver 328A and the second phase receiver 328B, the TOF sensing system 100 can estimate or calculate the flight time or the flight distance between the TOF sensing system 100 and the target 20.

For example, although not shown, it is assumed that a distance traveled by the modulated signal is 0 m. In this case, the amount of charge generated in response to the reflected signal, which is outputted from the first phase receiver 328A, may be 100%, but the second phase receiver 328B might output no charges, i.e., 0% amount of charge generated in response to the reflected signal.

A distance traveled by the modulated signal may be calculated based on a frequency (period) of the modulated signal and the speed of light. For example, when it is assumed that a frequency of the modulated signal is 1 Hz, the period of the modulated signal is 1 second. If an amount of charge generated in response to the reflected signal, which is outputted through the first phase receiver 328A, is 0% and the amount of charge generated in response to the reflected signal, which is outputted through the second phase receiver 328B, is 100%, it can be calculated that the entire time for the modulated signal to travel from the TOF sensing system 100 to the target and the reflected signal to travel back is 0.5 seconds. In this case, assuming that the travel times of the modulated and reflected signals are the same, the distance between the TOF sensing system 100 and the target is 0.25 seconds, which is a half of the entire flight time. The distance can be determined by multiplying 0.25 seconds and the speed of light.

Figure 7:
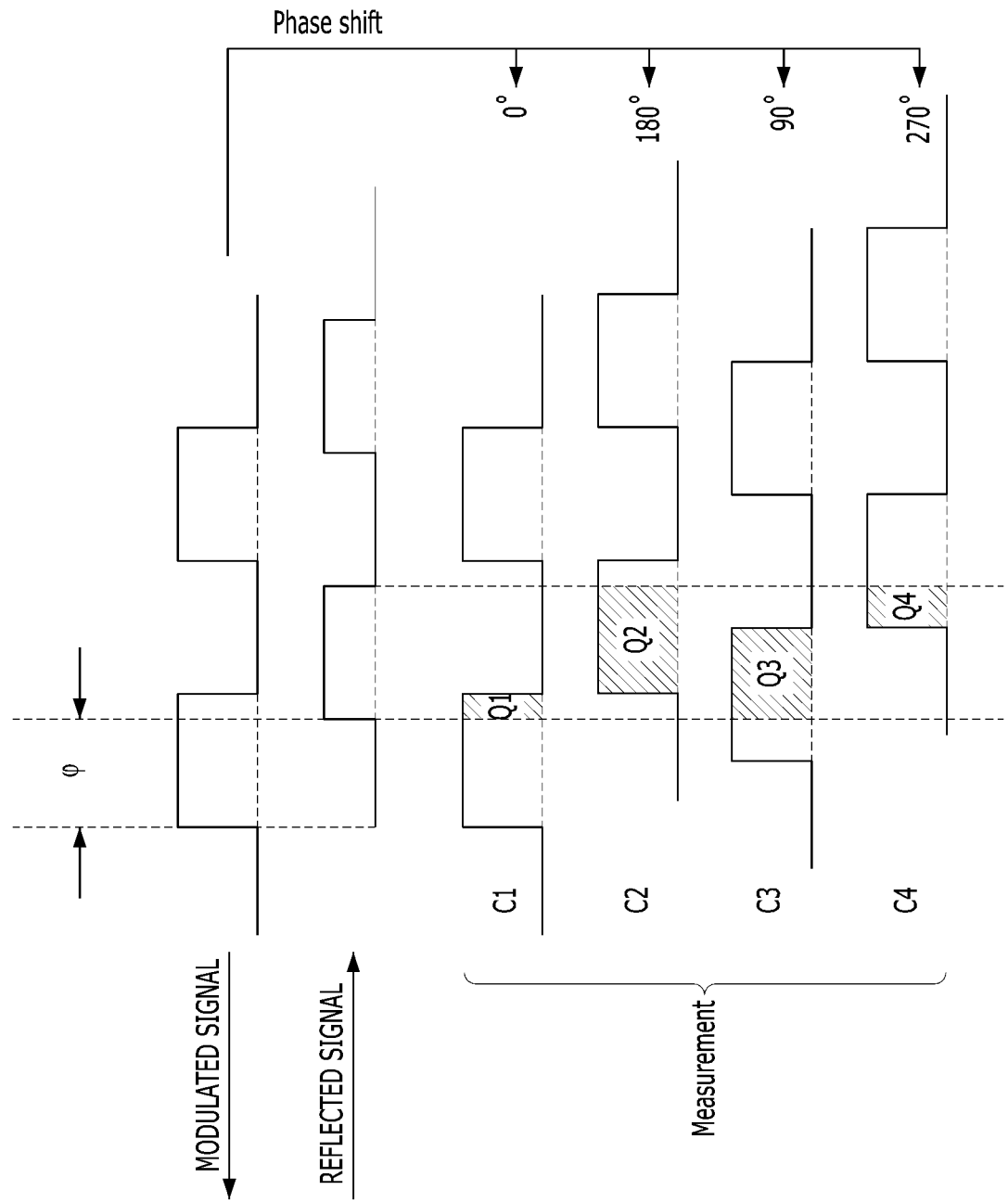
FIG. 7 describes a method of estimating a distance and a method of determining a magnitude of a modulated signal in a TOF sensing system according to an embodiment of the disclosure.

FIG. 7 describes a method of estimating a distance and a method of determining a magnitude of a modulated signal in a TOF sensing system according to an embodiment of the disclosure. Referring to FIGS. 3-4 and 6-7, a method for calculating a distance and a method for determining a magnitude of the modulation signal may be internal operations performed by the signal processors 130, 230.

Referring to FIG. 7, it is assumed that there is a phase difference φ between the modulated signal and the reflected signal. As described above with reference to FIGS. 1 to 4, the modulated signal outputted from the TOF sensing system 100 may be inputted as the reflected signal after reflected from the target 20.

Referring to FIGS. 3, 4 and 7, the modulated signal shown in FIG. 7 may be understood as a signal which is generated from the emitter 210 and outputted through the first lens unit 270. The reflected signal may represent a signal which is inputted to the receiver 220 through the second lens unit 280.

The time-of-flight sensing system 100 can shift a phase of a modulated signal. For example, phase shifts of 0°, 90°, 180° and 270° may be performed generated by the demodulators 150, 250. Referring to FIG. 6, a pair of 0° and 180° and/or another pair of 90° and 270° may be used in the receivers 120, 220. The phases used in the receivers 120, 220 are opposite to each other.

For example, phase-shifted signals C1, C2, C3, C4 used for recognizing the reflected signal in FIG. 7 can be considered as the driving control signal TC which is outputted from the demodulators 150, 250 and inputted to the receivers 120, 220, as described with reference to FIGS. 3 and 4.

Charge is generated according to the reflected signal such as the incident light. The light receiving element such as a photodiode in each pixel 128 can generate charge based on the incident light, but each pixel 128 may be controlled the phase-shifted signals C1, C2, C3, C4. Accordingly, each pixel 128 may output pixel information Q1, Q2, Q3, Q4 depending on the charge and the phase-shifted signals C1, C2, C3, C4 which correspond to the phase shifts of 0°, 180°, 90°, 270°, individually. For example, the first pixel information Q1 may be outputted from a pixel 128 controlled by the first phase-shifted signal C1, and the second pixel information Q2 may be outputted from another pixel 128 controlled by the second phase-shifted signal C2. In an embodiment where a pixel 128 has a two-tap scheme, the first pixel information Q1 and the second pixel information Q2 can be outputted from the same pixel 128, but through different transfer gates which may be individually controlled by driving signals having an opposite phase. In another embodiment where a pixel 128 has a single photodiode and a single transfer gate, the first pixel information Q1 and the second pixel information Q2 may be individually outputted from adjacent pixels 128 which may be individually controlled by driving signals having an opposite phase. The amount of charge generated by the light receiving element(s) may be split and outputted as the pixel information Q1, Q2, Q3, Q4. For example, plural pieces of pixel information Q1, Q2, Q3, Q4 corresponding to the reflected signal shown in FIG. 7 may be understood as the pixel information PI outputted from the receivers 120, 220 described with reference to FIGS. 3 and 4.

Based on this, the phase difference φ calculated by the signal processors 130, 230 described with reference to FIGS. 3 and 4 may be determined by the following equation.

$$\varphi = \tan^{-1}\left(\frac{Q4 - Q3}{Q1 - Q2}\right)$$

When the phase difference φ is determined, the distance may be calculated according to the speed of light (e.g., light constant c) and a frequency of the modulated signal f mod.

$$\text{Distance} = \frac{c}{2f_{mod}} \times \frac{\varphi}{2\pi}$$

In addition, an amplitude of the modulated signal may be estimated based on the pixel information Q1, Q2, Q3, Q4.

$$\text{Amplitude} = \sqrt{(Q1-Q2)^2 + (Q4-Q3)^2}$$

Through the above-described way, the TOF sensing system 100 may determine a frequency or an amplitude of the modulated signal and calculate a distance between the TOF sensing system 100 and the target 20. According to an embodiment, the frequency or the amplitude of the modulated signal may be changed according to an environment of the TOF sensing system 100.

On the other hand, in the operation of the TOF sensing system 100, as an amount of charge generated in response to the reflected signal may be outputted accurately based on each of the phase-shifted signals associated with the modulated signal, a distance error may be reduced and a resolution of depth information can be increased.

As described in FIG. 1, there are the modulated signal and the reflected signal, as well as natural or ambient light from the environment in which the TOF sensing system 100 works. For example, the modulated signal used in the TOF sensing system 100 may have a frequency band in an ultraviolet or infrared region. The modulated signal may also have the same frequency of any natural light or an optical signal. Even though the second lens unit 180, 280 may have a filter, natural or ambient light having a corresponding frequency band in an ultraviolet or infrared region can be inputted to the TOF sensing system 100. The natural light or ambient light may act as a noise and an interference. Therefore, when the TOF sensing system 100 is used outdoors during a day, the receivers 120, 220 may receive too much incident light due to the presence of natural or ambient light. If too much incident light is inputted to the receiver, the TOF sensing system 100 may not have an operation margin for calculating or estimating a distance to a target or depth information of the target.

Figure 8:
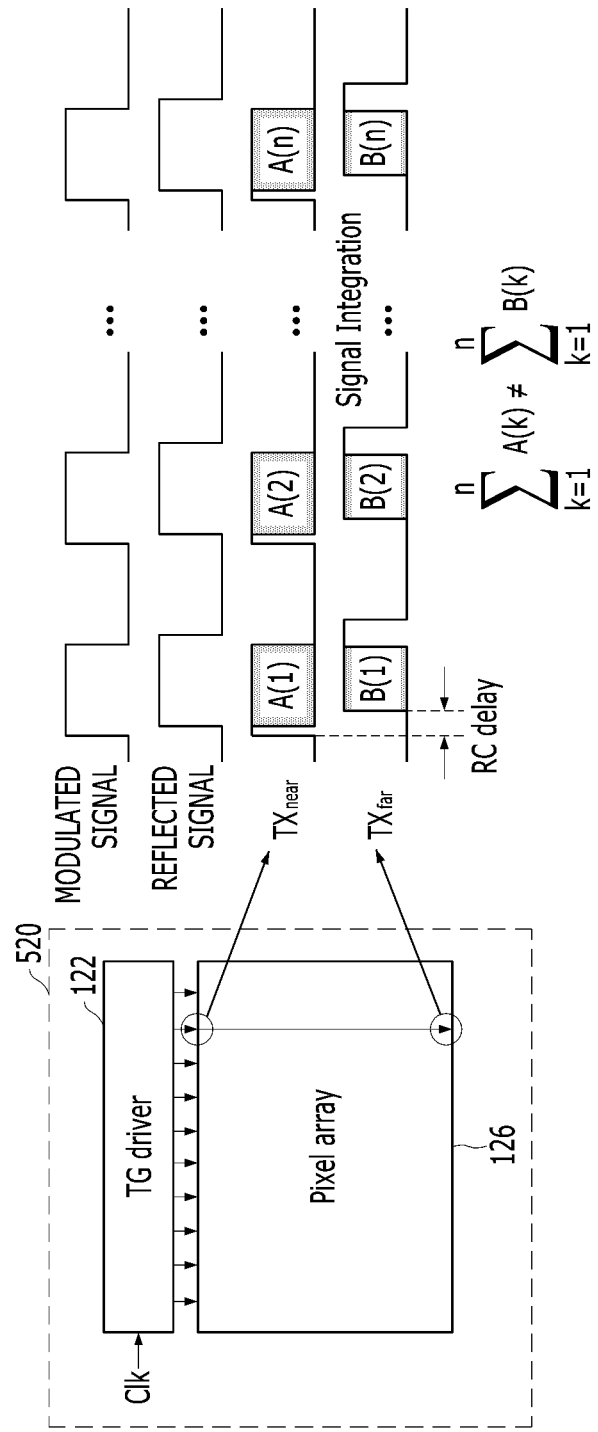
FIG. 8 illustrates a delay occurring while an image sensor, mounted in a TOF sensing system according to an embodiment of the disclosure, works.

FIG. 8 illustrates a delay occurring while an image sensor, mounted in a TOF sensing system according to an embodiment of the disclosure, operates.

Referring to FIG. 8, the image sensor 520 may include a pixel array 126 including a plurality of pixels 128 and a driving circuitry 122 configured to drive the pixel array 126. Referring to FIG. 5, in the pixel array 126, a plurality of pixels 128 may be arranged along a plurality of rows and a plurality of columns.

The driving circuitry 122 may supply a driving control signal (e.g., a set turn-on voltage) to the transmission gates TG or TG1, TG2 in each pixel 128 to turn on the transmission gates TG or TG1, TG2. The driving circuitry 122 may determine a phase of the driving control signal supplied to each pixel 128 in response to a clock signal Clk or the modulation signal.

Referring to FIG. 8, it is assumed that the driving control signal outputted from the driving circuitry 122 is supplied to the transfer gate of each pixel arranged along one column of the pixel array 126. Ideally, the driving control signal is supplied to transfer gates of all pixels at the same time. However, practically, a delay may occur in a column line transferring the driving control signal. Thus, a time difference may occur between when the driving control signal is supplied to the transfer gate TXnear of the pixel at the position closest to the driving circuitry 122 and when the driving control signal is supplied to the transfer gate TXfar of the pixel at the position farthest from the driving circuitry 122. In this case, the time difference of transferring the driving control signal may affect operation sections (e.g., pixel driving time) of the pixels, each pixel generating and outputting an amount of charge in response to the reflection signal.

Within the pixel array 126, even if the reflection signals received by two pixels respectively located closest and farthest to the driving circuitry 122 are identical (i.e., actual distances to the target 20 from the two pixels are the same), a calculated distance might be different when there is a time difference, caused by a delay, between the operation sections of the two pixels depending on their location with respect to the driving circuitry 126. Referring to FIGS. 6 and 7, the time difference may affect the calculated distance because the time difference may distort a phase difference occurred based on a phase relationship between the reflection signal received by each pixel and the modulation signal outputted from the emitter.

In particular, when the TOF sensing system 100 may perform an operation to calculate or estimate the distance between the TOF sensing system 100 and the target 20 more accurately through several stages (e.g., during several periods of the modulated signal and the reflected signal, distortion in the amount of reflected signal that can be recognized through the two pixels, i.e., the pixels located farthest and closest to the driving circuitry 122 in the pixel array 126 may become more serious (e.g., a difference due to the distortion may be larger). In other words, the greater the amount of the reflected signal sensed by the image sensor 520 in each stage, the greater the difference between sums of the amounts of the reflected signal, individually sensed by the closest and farthest pixels, as illustrated by following equation.

$$\sum_{k=1}^{n} A(k) \neq \sum_{k=1}^{n} B(k), \text{ where } \sum_{k=1}^{n} A(k)$$

represents the sum of the reflected signal sensed by the closest pixels and $$\sum_{k=1}^{n} B(k)$$

represents the sum of the reflected signal sensed by the farthest pixels, as illustrated in FIG. 8.

Accordingly, in the TOF sensing system, a measurement method for calculating a distance during several periods in order to obtain a more accurate distance may result in obtaining a more incorrect distance.

In order to overcome this issue, it may be suggested to increase a size (i.e., a width or a thickness) of column line transferring the driving control signal (e.g., a set voltage) supplied to the transfer gate of each pixel. Increasing the size of column line may decrease a resistance of column line so that the decreased resistance may reduce a delay in the column line. This method has an effect of reducing a resistance of column line and a delay of transferring the driving control signal via the column line, but may affect integration of the image sensor and incur a burden of making the column line size larger in a micro process for manufacturing the image sensor.

FIGS. 9A to 9D show an example for avoiding or overcoming a delay occurring while an image sensor, mounted in a TOF sensing system according to an embodiment of the disclosure, works. In FIGS. 9A to 9D, an order of pixels to which a driving control signal is supplied may be changed to compensate for a delay occurring when the driving control signal outputted from driving circuitry is transferred through a column line. According to an embodiment, a pixel array 326A, 326B, 326C, 326D can include plural pixels, each pixel which is supplied with the driving control signal outputted from the driving circuitry illustrated in FIGS. 9A to 9D. The pixel array 326A to 326D can include a pair of the first phase receiver 328A and the second phase receiver 328B individually capable of generating and outputting an amount of charge in response to the incident light based on opposite phases of the driving control signal, as described with reference to FIG. 6.

Figure 9A:
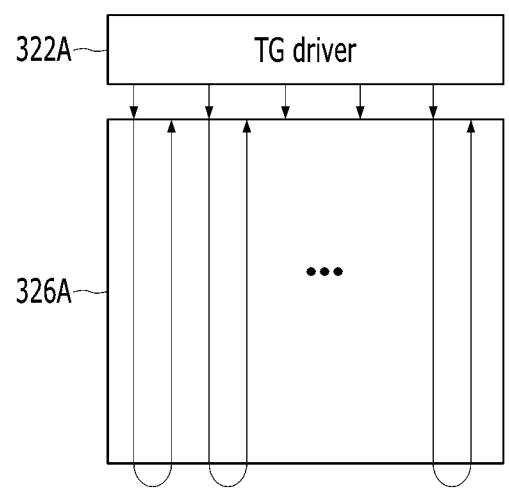
FIGS. 9A to 9D show an example for avoiding or overcoming a delay occurring while an image sensor, mounted in a TOF sensing system according to an embodiment of the disclosure, operates.

Referring to FIG. 9A, each pair of odd and even column lines may be coupled at a side of the pixel array 326A while the driving circuitry 322A supplies the driving control signal to the pixel array 326A at the opposite side of the pixel array 326A. As to each pair, a driving control signal outputted from driving circuitry 322A may be supplied to a terminal of the odd column at the side of the pixel array 326A and then transferred to a terminal of the even column at the opposite side of the pixel array 326A. In view of operation or driving time, the driving control signal may be supplied first to a transfer gate in the pixel closest to the driving circuitry 322A in the odd column, and the driving control signal may be supplied last to a transfer gate of the pixel closest to the driving circuitry 322A in the even column. Between those two driving time extremes, the driving control signal may be supplied to transfer gates of the pixels farthest from the driving circuitry 322A in the odd and even columns. In this case, if sensed amounts of two pixels adjacently arranged on the same row of the pair of odd and even columns are combined, there may be no difference in sensed amounts of the two pixels of the pair of odd and even columns between rows so that the image sensor 520 may compensate for a delay caused due to a different distance of each pixel from the driving circuitry 322A coupled to the pixel array 326A. For example, the TOF sensing system 100 may use combined pixel information of the two adjacent pixels in each row for calculating a distance between the TOF sensing system 100 and the target 20. Accordingly, a delay of transferring the driving control signal may be compensated because a sum of delays for two adjacent pixels in every row could be substantially identical with each other. Though each pixel is located at a different position from the driving circuitry 322A, this scheme shown in FIG. 9A may compensate for a different distance between pixels from the driving circuitry 322A.

Figure 9B:
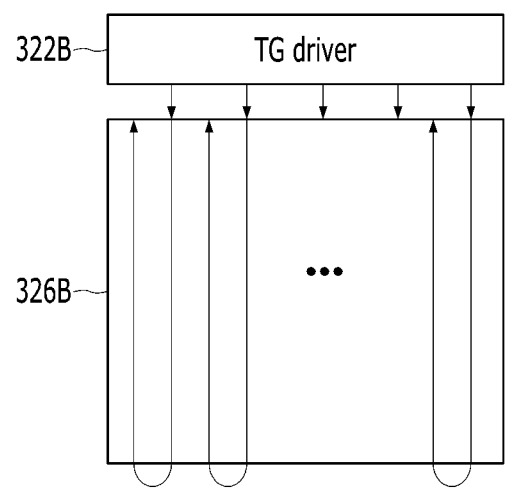

Referring to FIG. 9B, each pair of odd and even column lines may be coupled at a side of the pixel array 326B while the driving circuitry 322B supplies the driving control signal to the pixel array 326B at the opposite side of the pixel array 326B. As to each pair, a driving control signal outputted from driving circuitry 322B may be supplied to a terminal of the even column at a side of the pixel array 326B, and then transmitted to a terminal of the odd column at the opposite side of the pixel array 326A. In view of operation or driving time, the driving control signal may be supplied first to a transfer gate in the pixel closest to the driving circuitry 322B in the even column, and the driving control signals may be supplied last to a transfer gate in the pixel closest to the driving circuitry 322B in the odd row. Between those two driving time extremes, the driving control signal may be delivered to transfer gates of the pixels furthest from the driving circuitry 322B in the odd and even columns. Similar to the scheme shown in FIG. 9A, a sum of sensed amounts for two adjacent pixels of the pair of odd and even columns in every row may be substantially same so that a delay difference caused by a different distance between each row and the driving circuitry 322B may be compensated for. In the scheme shown in FIG. 9B, an average delay occurred in each row may be substantially the same so that the image sensor 520 may avoid distortion induced from the delay difference between rows.

Figure 9C:
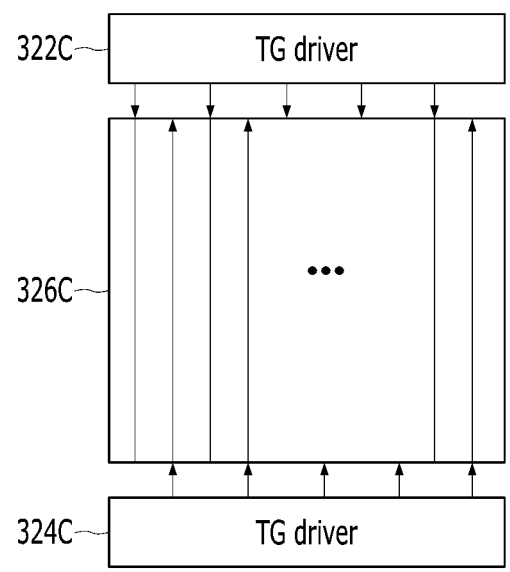

Referring to FIG. 9C, the image sensor 520 may include first driving circuitry 322C and second driving circuitry 324C which are disposed on two sides, i.e., opposite sides, of the pixel array 326C. In detail, the first driving circuitry 322C and the second driving circuitry 324C may individually supply first and second driving control signals to transfer gates of plural pixels in the pixel array 326C. The first and second driving control signals, individually outputted from the first driving circuitry 322C and the second driving circuitry 324C, are transferred to the pixel array 326C in opposite directions. The first driving circuitry 322C may supply the first driving control signal to odd pixels arranged on an odd column of the pixel array 326C, while the second driving circuitry 324C may supply the second driving control signal to even pixels arranged on an even column of the pixel array 326C. Herein, the first and second driving control signals may have a substantially identical phase. Although delays can occur in both the odd and even columns, sensed amounts of two adjacent pixels in the same row of the pair of the odd and even columns may be combined to compensate for the delay caused by a different distances from a given row to the first driving circuitry 322C and the second driving circuitry 324C, individually. An amount of delay may be determined based on a distance to a pixel from one of the first and second driving circuitry 322C, 324C. In this case, a sum of distances between two adjacent pixels in each row of the pair of the odd and even columns and the first and second driving circuitry 322C, 324C may be identical with each other, so that distortion caused due to a delay difference between pixels may be avoided. According to an embodiment, pixel information individually outputted from a pixel arranged in an odd column line and another pixel arranged in an even column line can be combined or summed for compensating the delay difference.

Figure 9D:
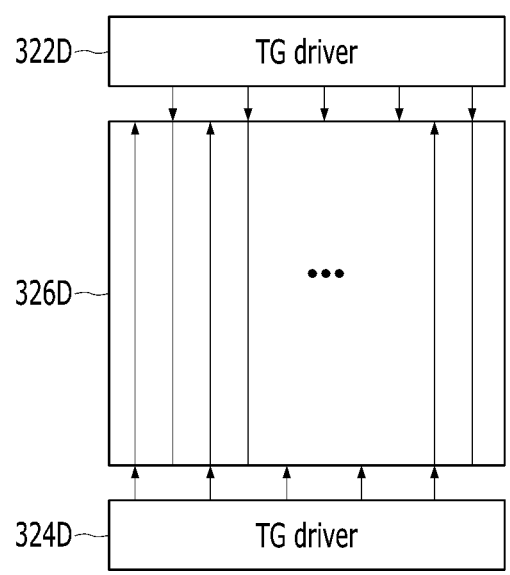

Referring to FIG. 9D, the image sensor 520 may include first driving circuitry 322D and second driving circuitry 324D which are disposed on upper and lower sides, i.e., opposite sides, respectively, of the pixel array 326D. In detail, the first driving circuitry 322D and the second driving circuitry 324D may individually supply first and second driving control signals, respectively, to transfer gates of plural pixels in the pixel array 326D. The first and second driving control signals are transferred to the pixel array 326D in opposite directions. The first driving circuitry 322D may supply the first driving control signal to even pixels arranged on an even column of the pixel array 326D, while the second driving circuitry 324D may supply the second driving control signal to odd pixels arranged on an odd column of the pixel array 326D. Herein, the first and second driving control signals may have a substantially identical phase. Although delays can occur in both the odd and even columns, sensed amounts of two adjacent pixels in the same row of the pair of the odd and even columns may be combined to compensate for the delay caused by a different distance to each row from the first driving circuitry 322D and the second driving circuitry 324D. An amount of delay may be determined based on a distance between a pixel and one of the first and second driving circuitry 322D and 324D. In this case, a sum of distances from the first driving circuitry 322D and the second driving circuitry 324D between two adjacent pixels in each row of the pair of the odd and even columns may be identical with each other, so that distortion caused by the above-described delay may be avoided.

In FIG. 9D, first driving circuitry 322D and second driving circuitry 324D may be disposed on both sides (opposite sides) of pixel array 326D. Like the scheme shown in FIG. 9C, the first driving circuitry 322D and the second driving circuitry 324D may individually supply first and second driving control signals to transfer gates of plural pixels in the pixel array 326D. The first and second driving control signals are transferred to the pixel array 326D in opposite directions. The first driving circuitry 322D may supply the first driving control signal to the even column of the pixel array 326D, and the second driving circuitry 324D may supply the second driving control signal to the odd row of the pixel array 326D. A sum of distances between two adjacent pixels in each row of the pixel array 326D and the first and second driving circuitry 322D, 324D may be identical with each other, Even if delay occurs in both the even and odd columns individually, a delay difference between rows of the pixel array 326D may be removed. Thus, distortion caused due to a delay difference between pixels may be reduced.

Figure 10:
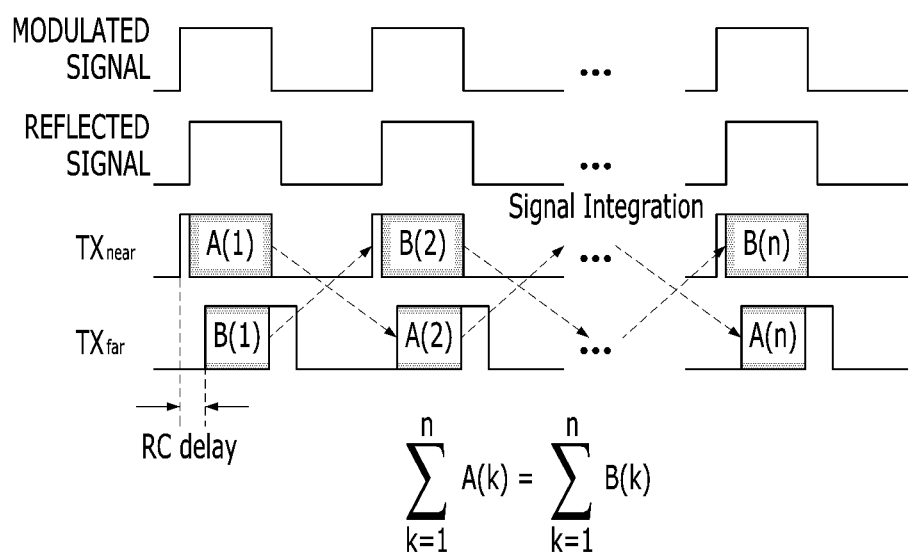
FIG. 10 illustrates improved performance through the examples described in FIGS. 9A to 9D, regarding a delay while an image sensor operates.

FIG. 10 illustrates improved performance through the examples described in FIGS. 9A to 9D, regarding a delay while an image sensor operates.

Referring to FIG. 10, the times at which a driving control signal is supplied to different pixels may be not identical due to a delay. There may be a phase difference between driving control signals supplied to the transfer gate TXnear of the pixel at the position closest to a driving circuitry and the transfer gate TXfar of the pixel at the position farthest from the driving circuitry, even if the driving control signals are the same signal. As shown in FIGS. 9A to 9D, an order in which the pixels are supplied the driving control signals may be changed to compensate for the delay of transferring the driving control signals outputted from the driving circuitry. For example, integrating pixel information outputted from two pixels may have substantially same delay compensation effect, when the two pixels are associated with the driving control signal individually supplied to both the transfer gate TXnear of the pixel closest to the driving circuitry and the transfer gate TXfar of the pixel farthest from the driving circuitry.

In FIG. 10, operation sections of the pixels individually locating at the positions closest and farthest from the driving circuitry in multi stages may be integrated to avoid distortion. For example, an operation section of the pixel having the transfer gate TXnear driven in a first period of the driving control signal may be integrated with another operation section of the pixel having the transfer gate TXfar driven in a second period. Further, in another embodiment, operation sections of the pixels having the transfer gate TXnear and the transfer gate TXfar driven in a same period of the driving control signal may be combined. Referring to FIGS. 9A and 9B, an operation section of the pixel having the transfer gate TXnear driven in a first period of the driving control signal may be integrated with another operation section of the pixel having the transfer gate TXfar driven in the first period.

As described in FIG. 8, a difference between operation sections of the pixels individually located at positions closest and farthest to the driving circuitry may increase as sensing continues for multiple periods or in multi stages. However, in that case, pixel information outputted from two pixels may be integrated over several periods. Therefore, the difference between sums of the amounts of the reflected signal, individually outputted from the pixels located farthest and closest, may be removed even when the amount of the reflected signal sensed by the image sensor 520 increases. Thus, signal integration (e.g., pixel information integration) may remove the difference as the following equation.

$$\sum_{k=1}^{n} A(k) \neq \sum_{k=1}^{n} B(k), \text{ where } \sum_{k=1}^{n} A(k)$$

represents the sum of amounts of the reflected signal sensed by the closest pixels and $$\sum_{k=1}^{n} B(k)$$

represents the sum of amounts of the reflected signal sensed by the farthest pixels, as illustrated in FIG. 10.

Though pixel positions in the pixel array may cause a delay of transferring the driving control signal, this scheme may compensate for the delay. This scheme might not primarily prevent a delay depending on a different operation section corresponding to a different distance between each pixel and the driving circuitry. However, this scheme may provide a way to compensate for the delay through the signal integration. The TOF sensing system may avoid distortion caused due to a difference between operation sections of pixels, which depends on positions of the pixels in the pixel array.

According to an embodiment of the disclosure, a time-of-flight (TOF) sensing system can more accurately measure a distance to a target or an object in a scene, thereby generating a three-dimensional (3D) image including depth information regarding the target or the object in the scene.

In addition, an embodiment of the disclosure can provide an image sensor configured to compensate for a delay of supplying a driving voltage, which may be differently determined according to a position or a location of each pixel in a pixel array. Each pixel may generate an amount of charge in response to an incident light which is reflected from a target or an object. The delay of supplying the driving voltage may be compensated for on a basis of where the driving voltage is supplied at each pixel. In a TOF sensing system providing depth information to generate a three-dimensional (3D) image, the image sensor compensating for the delay based on a supply order of driving voltage between pixels may provide more effective and faster delay compensation than a configuration employing a separate algorithm of signal processing.

While the present invention has been illustrated and described with respect to specific embodiments, it will be apparent to those skilled in the art in light of the present disclosure that various changes and modifications may be made without departing from the spirit and scope of the disclosure as defined in the following claims. The present invention encompasses all changes and modifications that fall within the scope of the claims.

What is claimed is:

1. An image sensor employed in a time-of-flight (TOF) sensing system, comprising:
   a pixel array including a plurality of pixels arranged in plural rows and plural columns, each pixel generating an amount of charge in response to an incident light; and first driving circuitry configured to supply a driving control signal to each pixel via the plural columns, wherein the first driving circuitry is configured to supply the driving control signal via one of odd and even columns, the odd and even columns forming a single combined unit.

2. The image sensor according to claim 1, wherein the image sensor has a first structure in which the first driving circuitry supplies the driving control signal to a terminal of the odd column or a second structure in which the first driving circuitry supplies the driving control signal to a terminal of the even column, and wherein the other terminal of the odd column is connected to the other terminal of the even column in the single combined unit.

3. The image sensor according to claim 1, wherein the driving control signal is successively supplied from a first pixel to a last pixel among pixels coupled to the single combined unit.

4. The image sensor according to claim 3, wherein the first pixel and the last pixel coupled to the single combined unit are located in a same row of the pixel array.

5. The image sensor according to claim 3, wherein the single combined unit includes twice as many pixels as each of the odd and even columns.

6. The image sensor according to claim 1, wherein each pixel includes at least one photo diode and at least one transfer gate, wherein each pixel has the same number of photo diodes and the same number of transfer gates, and wherein the driving control signal is inputted to the at least one transfer gate of each pixel.

7. The image sensor according to claim 1, wherein each pixel includes:

first receiving circuitry configured to receive the incident light in a first phase section; and second receiving circuitry configured to receive the incident light in a second phase section which is opposite to the first phase section.

8. An image sensor included in a time-of-flight (TOF) sensing system, comprising:

a pixel array including a plurality of pixels arranged in plural rows and plural columns, each pixel generating an amount of charge in response to an incident light;

first driving circuitry configured to supply a first driving control signal through one of odd/even columns in the pixel array, the first driving control signal supplied in a direction of a first row to a last row in the pixel array; and second driving circuitry configured to supply a second driving control through the other of the odd/even columns in the pixel array, the second driving control signal supplied in a direction of the last row to the first row in the pixel array.

9. The image sensor according to claim 8, wherein the second driving control signal is transferred via the even column of the plural columns when the first driving control signal is transferred via the odd column of the plural columns, or wherein the second driving control signal is transferred via the odd column of the plural columns when the first driving control signal is transferred via the even column of the plural columns.

10. The image sensor according to claim 8, wherein the first and second driving control signals are individually supplied via an alternate one of the plural columns.

11. The image sensor according to claim 8, wherein the first and second driving circuitry are arranged on the opposite sides of the pixel array.

12. The image sensor according to claim 8, wherein each pixel includes at least one photo diode and at least one transfer gate, wherein each pixel includes the same number of photo diodes and the same number of transfer gates, and wherein the driving control signal is inputted to the at least one transfer gate of each pixel.

13. The image sensor according to claim 8, further comprising:

a signal converter configured to convert pixel information outputted from the pixel array into a digital signal.

14. A time-of-flight (TOF) sensing system, comprising:

an emitter configured to output a modulated signal having a set phase;

an image sensor configured to receive a reflected signal which is inputted in response to the modulated signal reflected from an object; and a signal processor configured to determine a distance from the object based on a phase relationship between the modulated signal and the reflected signal, wherein the image sensor comprises:

a pixel array including a plurality of pixels arranged in plural rows and plural columns, each pixel generating an amount of charge in response to the reflected signal; and first driving circuitry configured to supply a driving control signal to each pixel via the plural columns, wherein the first driving circuitry is configured to supply the driving control signal via one of odd and even columns, the odd and even columns forming a single combined unit.

15. The TOF sensing system according to claim 14, wherein the image sensor has a first structure in which the first driving circuitry supplies the driving control signal to a terminal of the odd column or a second structure in which the first driving circuitry supplies the driving control signal to a terminal of the even column, and wherein the other terminal of the odd column is connected to the other terminal of the even column in the single combined unit.

16. The TOF sensing system according to claim 14, wherein the driving control signal is successively supplied from a first pixel to a last pixel among pixels coupled to the single combined unit.

17. The TOF sensing system according to claim 16, wherein the first pixel and the last pixel coupled to the single combined unit are located in a same row of the pixel array.

18. The TOF sensing system according to claim 16, wherein the single combined unit includes twice as many pixels as each of the odd and even columns.

19. The TOF sensing system according to claim 14, wherein each pixel includes at least one photo diode and at least one transfer gate, wherein each pixel includes the same number of photo diodes and the same number of transfer gates are identical, and wherein the driving control signal is inputted to the at least one transfer gate of each pixel.

20. The TOF sensing system according to claim 14, wherein the pixel includes:

first receiving circuitry configured to receive the incident light in a first phase section; and second receiving circuitry configured to receive the incident light in a second phase section which is opposite to the first phase section.

\* \* \* \* \*